United States Patent
Gulko et al.

(10) Patent No.: US 7,174,381 B2
(45) Date of Patent: Feb. 6, 2007

(54) PARALLEL COMPUTING SYSTEM, METHOD AND ARCHITECTURE

(75) Inventors: Abraham Gulko, East Brunswick, NJ (US); David Mellor, Warwickshire (GB)

(73) Assignee: Aspeed Software Corporation, New York, NY (US)

( * ) Notice: Subject to any disclaimer, the term of this patent is extended or adjusted under 35 U.S.C. 154(b) by 428 days.

(21) Appl. No.: 10/310,115

(22) Filed: Dec. 4, 2002

(65) Prior Publication Data

US 2003/0177240 A1 Sep. 18, 2003

Related U.S. Application Data

(60) Provisional application No. 60/338,278, filed on Dec. 4, 2001.

(51) Int. Cl.
*G06F 15/173* (2006.01)
(52) U.S. Cl. .................. 709/226; 717/119; 717/149; 718/105
(58) Field of Classification Search ............. 717/119, 717/148, 151, 149; 718/105; 709/201, 223
See application file for complete search history.

(56) References Cited

U.S. PATENT DOCUMENTS

| | | | | |
|---|---|---|---|---|
| 5,752,036 A | * | 5/1998 | Nakamura et al. | 717/149 |
| 5,946,487 A | * | 8/1999 | Dangelo | 717/148 |
| 6,021,274 A | * | 2/2000 | Reed et al. | 717/149 |
| 6,104,962 A | | 8/2000 | Sastry | 700/86 |
| 6,223,205 B1 | * | 4/2001 | Harchol-Balter et al. | 718/105 |
| 6,292,822 B1 | * | 9/2001 | Hardwick | 718/105 |
| 6,321,373 B1 | * | 11/2001 | Ekanadham et al. | 717/119 |
| 6,347,253 B1 | | 2/2002 | Fujita et al. | 700/28 |
| 6,557,168 B1 | * | 4/2003 | Czajkowski | 717/151 |
| 6,708,331 B1 | * | 3/2004 | Schwartz | 717/160 |

* cited by examiner

*Primary Examiner*—John Follansbee
*Assistant Examiner*—Dustin Nguyen
(74) *Attorney, Agent, or Firm*—McDermott Will & Emery, LLP

(57) ABSTRACT

A parallel or computing system and method make use of a plurality of adapters each affording a specific type of processing algorithm. At each point in an application, an adapter is identified, to parallelize that portion of the application. The process involves associating an appropriate adapter with the application portion, parsing the application portion to define tasks that may be distributed over the available computers. Combined with the parallelized program is a software server that is designed to cooperate with the adapters to control and supervise distributed processing functions. Such functions include mapping, load balancing, and error detection and correction. Also included are functions that cause the results of the computing to be coordinated in real-time and returned appropriately, according to the application. In addition to the parallelized program and server, an application created by the present invention is provided with the functionality of virtual middleware, which interfaces with and controls existing forms of middleware.

10 Claims, 9 Drawing Sheets

PARALLEL COMPUTING SYSTEM, METHOD AND ARCHITECTURE

This patent application claims the benefit of priority under 35 U.S.C. § 119 of U.S. Provisional Patent Application Ser. No. 60/338,278, filed Dec. 4, 2001, entitled "Parallel Computing System And Architecture," the entirety of which is hereby incorporated by reference.

FIELD OF INVENTION

The present invention relates generally to parallel computing and, more particularly, concerns a software system, method and architecture that permit existing and new computer programs to be converted, at the algorithm level, for true parallel processing.

BACKGROUND OF THE INVENTION

Various businesses have a need to run computer applications involving extensive computer processing, and computation time can be a vital factor in the success of the business. Hence there is a perpetual quest for increased computing power and reduction in computational time. For example, in the financial industry, there are many computational intensive factors, including: pricing and hedging complex derivatives; portfolio-pricing, hedging and risk (market, credit, and operational) calculations; value at risk calculations, end of day marked-to-market processing and report generation; and calibrating financial model to market.

The computation time can have a critical impact on the value and usefulness of the calculations. Continuing with the financial industry example, the 5 and 7 year Euro Dollar basis may be slipping relative to the 10-year swap one hour before the close of the financial-market trading period. The fixed income derivatives desk needs to re-calibrate its multi-factor model and re-hedge it's interest rate and volatility risk immediately because of conditions resulting in substantial variability of the yield curve. If the desk does not hedge, it will have a significant loss. Typically, it takes 30 minutes to re-calibrate a multi-factor model; 2 hours for mark-to-market of the portfolio; and 3 hours for risk reports; in all, 5 hours. In this situation, the desk cannot respond adequately in a timely manner and will likely put a costly, inaccurate hedge in place.

One way to solve large, complex problems in real time or minimum time is by using a supercomputer such as the Cray. Of course this option is very costly and not practical for the typical business.

Another way to achieve substantial computing power is through parallel (simultaneous) processing. Inexpensive off-the-shelf-processors, such as recent Pentium and Alpha chips have become very powerful, and they can be harnessed together in parallel for increased processing speed. Certain computers, mainly servers, have been provided with multiple processors to share the processing load, speeding overall operation. On a higher level, multiple computers have been linked together over a network in "cluster computing" arrangements, to act like a virtual computer. The basic concept is that the processing workload of an application is split into manageable sections that are distributed among the networked computers, to achieve relatively quick solutions of computational problems that are normally time-consuming. However, computer clusters perform distributed computing without controlling the return of results. On the other hand, the ideal of parallel processing is to achieve true parallel computing, which provides intelligent parsing and mapping of the workload to different processors, fault tolerance of the workload activity, balancing of the work, coordinating return of results, and scalability. Although systems achieving a degree of distributed computing have been available, true distributed, parallel computing has not been achieved until the present invention.

There are three general levels in the hierarchy of distributed computing. The simplest is task distributed processing. At this level, the identical application is run on multiple computers in a cluster, with a different set of initial parameters being passed to each computer. In order to achieve this level of distributed processing of an application, a user must develop a substantial amount of code to implement that processing. Commercial systems have been available to accomplish this, but they permit distributed processing of only the simplest linear problem.

At the second level of the hierarchy is data-distributed processing, which permits the computations of iterative processing loops in an application to be distributed across a computer cluster. To make use of this form of distributed processing in an application, substantial modification of the code internals and loop processing are necessary to develop the application. Even then, parallel computation is limited to the loop components and is not achieved at an algorithm level. Also, the heavy data distribution tends to utilize significant bandwidth, causing congestion in networks. This form of distributed processing may be used for linear problems but not non-linear problems. At least one commercial system has been available which achieves this level of distributed processing.

At the top of the hierarchy is algorithm distributed processing, in which the algorithm of an application is itself distributed among the computer cluster. This is achieved within the program itself by dynamically distributing the algorithm directives. This form of distributed processing is also lower in network bandwidth usage, because distribution is limited to the algorithm rather than a voluminous amount of data. Systems achieving algorithm distributed processing have not been available commercially.

Cluster middleware is used to interface between the server requesting distributed processing of an application and a computer cluster, to achieve distributed processing. The middleware is typically executable code made available by a vendor, which must be incorporated into an application adapted for distributed processing. The user must write a substantial amount of code to interface properly with the middleware and to utilize its available features.

As already explained, the most effective parallel computing involves distribution of tasks at the algorithm level of the program. Most computing falls into basic types of known algorithms. Some common algorithms are linear (structured); nonlinear (complex structure); Monte Carlo; non-recombining tree; Complex Monte Carlo; Branch & Bound (Multidimensional Solver); and Associative Network.

Existing parallel computing implementations fail to provide the capacity to parallelize paradigms except for the simplest linear type. In many industries, front, middle and back offices utilize diverse algorithms and applications. Many of these applications are time sensitive and mission critical and therefore require reduction in computation time and an increase in result accuracy. Diverse groups within enterprises require a universal parallel computing platform, ease of deployment of existing applications to a parallel computing platform, and ease of creation of new applications for a parallel computing platform.

What is needed in the art is the capacity to run essentially any parallel computing program on any distributed network.

In particular in financial services and energy companies there is a strong need for a scalable distributed computing platform. The present invention solves these and other needs.

SUMMARY OF THE INVENTION

The present invention provides a system, method and architecture to achieve a true parallel computing infrastructure. This infrastructure provides the capability to transform an application into a parallel computing program and facilitate execution of the resulting program on an existing network of computers. The system and method effectively allow any algorithm-based application to operate on essentially any platform. The present invention may be used to model and deploy virtually any type of parallel computing paradigm to solve any type of computationally intensive problem.

The parallel computing method in accordance with the preferred embodiment of the invention makes use of a plurality of adapters each affording a specific type of processing algorithm. At each point in an application, an adapter is identified to parallelize that portion of the application. Specifically, the process involves associating an appropriate adapter with the application portion, parsing the application portion to define tasks that may be distributed over the available computers. Combined with the parallelized program is a software server engine (Lobster), which is designed to cooperate with the adapters to control and supervise, distributed processing functions. Such functions include mapping, load balancing, and error detection and correction as well as work splitting, distribution to slave computers, and gathering and coordination of results. Also included are functions that cause the results of the computing to be coordinated in a real-time and returned appropriately, according to the application. In addition to the parallelized program and Lobster, an application created by the present invention is provided with the functionality of virtual middleware (DNET), which interfaces with and controls existing forms of middleware.

In accordance with one aspect of the present invention, a method for parallelizing an application is provided. In that method, a plurality of adapters are provided, each affording a specific type of processing algorithm. At successive portions in an application, an adapter appropriate for parallelizing that portion of the application is identified and associated with the portion. A code segment which represents the functionality of for each identified portion and which includes a call to a client-server library is generated, and a call to the client-server library is included in the application which, at run-time, launches said codes segment from a main entry point in each respective code segment in lieu of executing the portion.

In accordance with another aspect of the present invention, a method for running a parallelized application in which a pool of work is to be performed is provided. In that method, a master server that operates in a master mode is used to instantiate a stateless server which contains a first object including a code segment suitable for processing work from the pool. The master server dispatches to the stateless server a first portion of work from the pool. Reports are provided to the master server concerning the progress of the first portion of work dispatched to the stateless server, and additional portions of work are distributed from the master server to the stateless server once a prescribed amount of work progress has been reported by the stateless server.

A salient aspect of the foregoing method is that the stateless server can be established either in a slave mode, or in a dual mode including a master mode in which the stateless server serves as a master to other servers.

These and other aspects, features and advantages can be appreciated from the attached figures and the accompanying description of certain embodiments

BRIEF DESCRIPTION OF THE DRAWINGS

The foregoing brief description, as well as further objects, features, and advantages of the present invention will be understood more completely from the following detailed description of a presently preferred but non-the-less, illustrative, embodiment in accordance with the present invention, with reference being had to the accompanying drawings in which.

DEFINITIONS

As used herein, the following terms shall have the meanings stated below.

"Application" is an existing software product that is to be parallelized. That product is parsed to identify portions that can execute in parallel. Each portion has at least one algorithm.

"Client/Server Library" is used to deliver the program to the user for paralleling portions of the application.

"Cluster" is a collection of resources (usually servers or workstations) used in a computation in an effort to speed up program execution. This term is often used in the context of the Internet servers to refer to a set of web servers connected together for fail-over and high-availability purposes.

"Decomposition" refers to the process of breaking a piece of work down into smaller computations that can be executed on different computers.

"High Performance Computing" or "HPC" is the application of parallel computing practices to a problem set in order to speed up application execution time or to be able to handle more data.

"Message Passing Interface" or "MPI" is a collection of application Programming Interfaces and message passing primitives used to create parallel programs.

"Parallel Virtual Machine" or "PVM" is a programming environment developed at Oak Ridge National Laboratories that supports a series of message passing and process management operations.

"Parallelization" refers to the process of turning a sequentially ordered set of programmatic operations into a set of smaller operations that can be executed substantially independent of one another for the purposes of speeding up the overall computation.

"Program" is the software that embodies the lobster engine, makes calls to a client/server library, and includes an extensible set of adapters.

DETAILED DESCRIPTION OF CERTAIN EMBODIMENT

Figure 1:
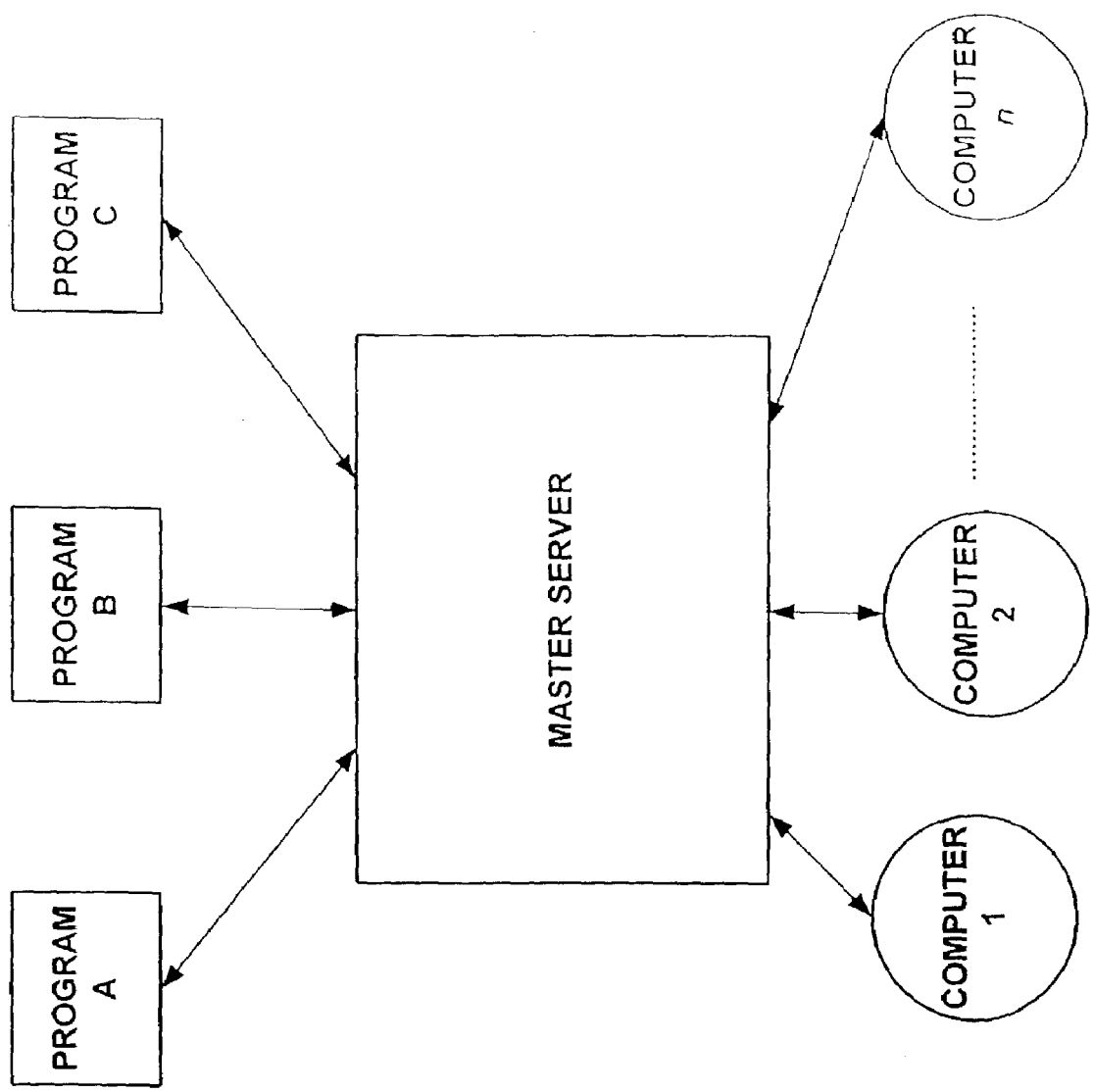
FIG. 1 is a functional block diagram illustrating a traditional parallel computing system architecture.

FIG. 1 is a functional block diagram illustrating traditional parallel computing technology. In this example, parallel computing is to be achieved for three programs, Programs A, B and C, via clustered computers 1-n. One hardware-based master server controls all parallel computing activities. The server, however, lacks specific knowledge of the different types of problems being handled in each program: it has network workload knowledge, but no "problem" workload knowledge. Accordingly, resources are utilized inefficiently. In addition, the middleware is hard-coded in order to permit appropriate communication with computers 1-n. Should the master server fail, there will be a systematic collapse of virtually all parallel computing processes. Moreover, any effort to replicate the master server is highly technical, cumbersome, and unlikely to succeed.

Figure 2:
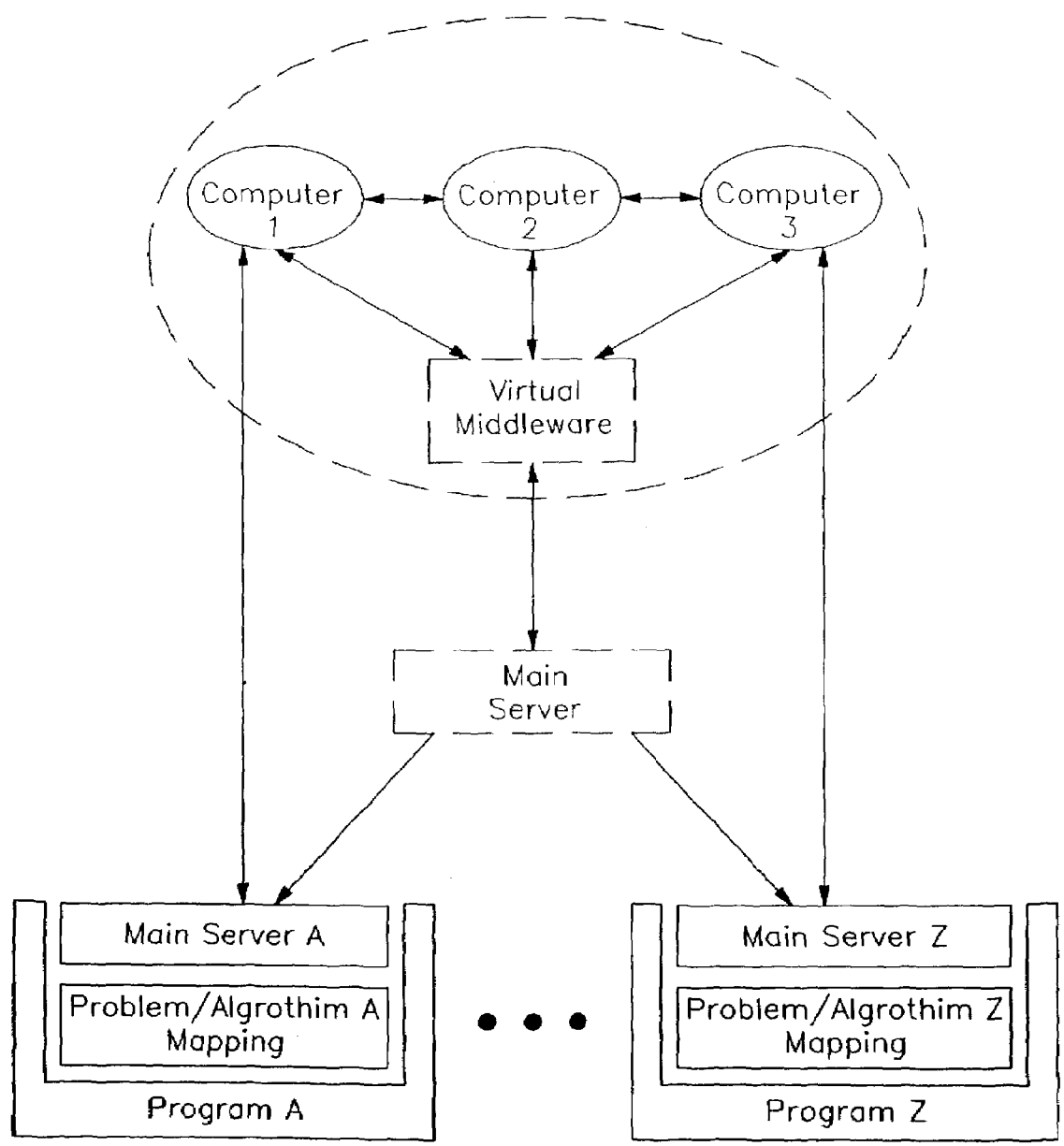
FIG. 2 is a functional block diagram illustrating how parallel computing is enhanced in accordance with a preferred embodiment of the present invention.

FIG. 2 is a functional block diagram illustrating how parallel computing is enhanced in accordance with an embodiment of the present invention. In the present example, applications A–Z are to be processed in parallel on a cluster comprising computers 1–3. As will be explained more completely below, applications A–Z have been modified, utilizing adapters in accordance with the present invention, in order to obtain an application that achieves algorithm-distributed processing. In addition, a software-based server has been embedded into each program, the software servers collectively defining a virtual main server. Each of the software servers is aware of the specifics of its algorithm portion, allowing for precise parallel-computing resource allocation. Moreover, failure of a particular application portion has no effect on the other application portions being processed in parallel therewith. A particular server can be replicated automatically to execute the corresponding portion on another machine. In the preferred embodiment, each server is called a LOBSTER (LOad Balancing Sub-Task Executer).

Also present in each program is virtual middleware, which is designed as a universal interface to all available middleware. Thus, the server within the application is able to take full advantage of all features available in every type of middleware. In the present example, this has enabled peer-to-peer communication among the computers 1–3. In the preferred embodiment, the virtual middleware is called DNET (Distributed NETwork).

Thus, the invention provides an application service layer that speeds the development of computationally intensive and data intensive applications, and an application framework with all of the functionality needed to support a fully parallelized application.

Figure 2A:
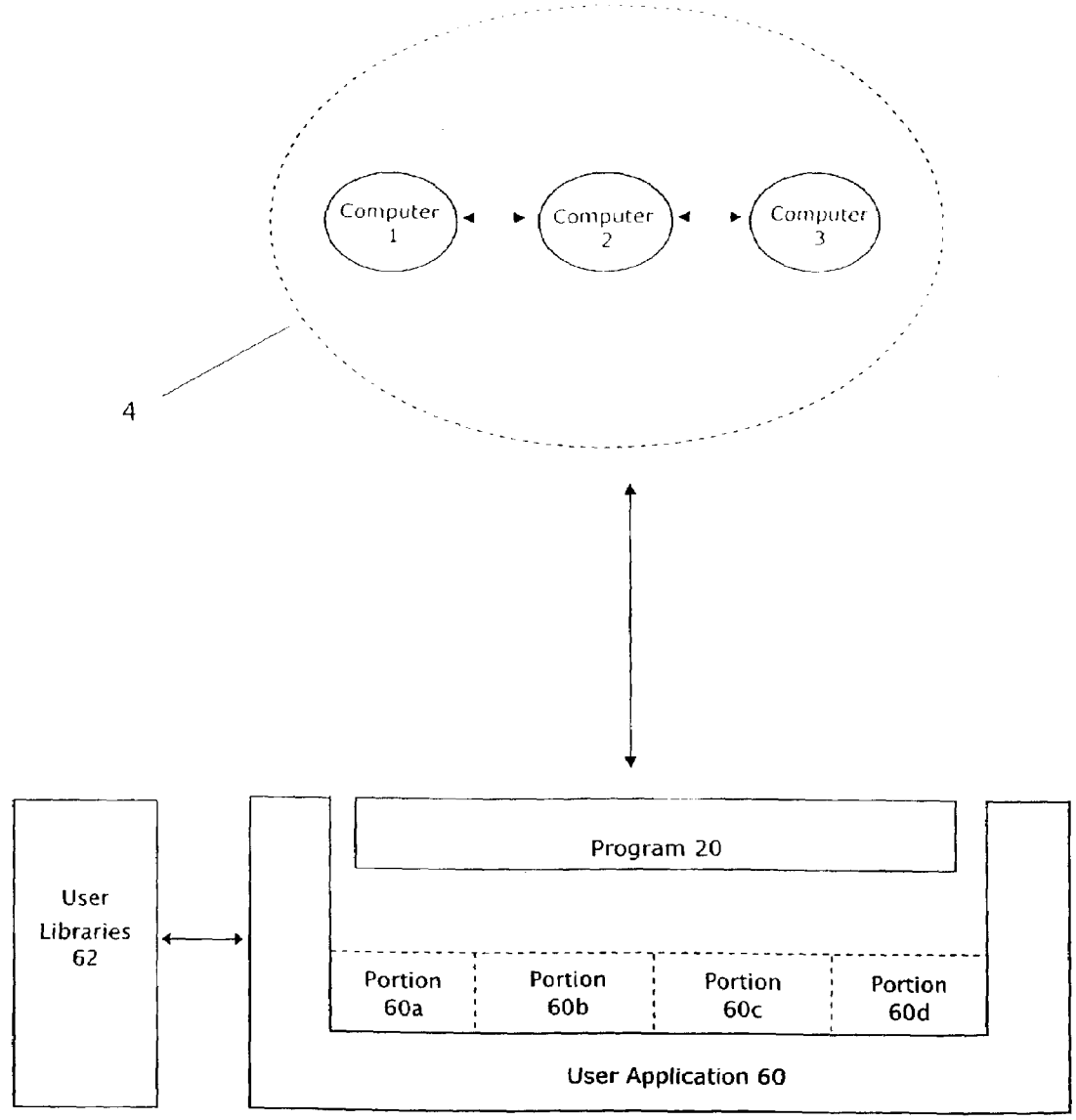
FIG. 2a is a functional block diagram illustrating further details of a parallelized application in accordance with a presently preferred embodiment.

The software program that includes the adapters and lobster (including the main server and problem/algorithm applying components of FIG. 2) comprise a program 20 that parallelizes the user's application 60, and manages its parallel operation it run-time. FIGS. 2A and 3A provide further details of the interaction of a particular user application 60 and this program 20.

In FIG. 2A, a single user application 60 is illustrated; however, it should be understood that the methodology and system of the present invention can be operated with multiple user applications, generally as indicated in FIG. 2. The user application 60 can comprise any sort of application, but for purposes of illustration only, the user application is described by way of example as the Microsoft Word (™) word processing program. The user application 60 includes a number of portions 60A, 60B, etc., which illustratably can be a word count routine, a spell check routine, and any number of other routines that would typically exist in a word processing environment. In the context of other user applications such as those used in the financial services industry, the portions are suitably configured to implement particular algorithms such as credit models, values at risk, Peter Carr models, and the like. It is common in the development of applications, at the present time, to periodically rely upon libraries such as the Microsoft library 62 to source one or more of the portions from a location that is external to the application 60 itself, yet which interact with the application 60 provide full functionality to routines that are within the applications, either as embedded routines or as routines selected by a user through an interface. Such a user library 62 can be used with multiple user applications, for example, the same library routine that is utilized by Microsoft Word can be utilized by other Microsoft applications, such as Microsoft Excel.

The various portions of the user application 60 are generally referred to as portions 60A, 60B, 60C, etc.

The program 20 includes an extensible set of adapters 10 that cooperate with a lobster engine 22 to map out the algorithm specified in a particular portion 60A, 60B of the user application. One adapter in the set will be most suitable for a given portion, or the user can define a new adapter to address specific needs of a given portion.

The program 20 can generally be considered as comprising three layers. At the top layer there is a user interface 24 which includes the set of extensible adapters 10. Below that layer is the lobster engine 22 which includes a number of software constructs that permit portions of the user application 60, (which have been processed by one of the adapters or by an adapter SDK 12) to be utilized by the engine in a fault tolerant and load balanced manner. Below the lobster engine is an execution layer 18 which is primarily concerned with the network resources that are available at a given time to the program 20. The execution layer 18 is concerned with fault tolerances and resource management issues concerning the computers and other machines that are connected to the network 4 rather than to the stability and operation of any particular mapped portion 60A, 60B, etc. The foregoing layer descriptions are to assist in an understanding of the architecture of the program 20, and are not true divisions in the program itself.

With further reference to FIG. 2A, once the user application 60 has been processed by the program 20, individual portions can be farmed out to the available resources on a remote network 4. As will be described next, each of the portions is analyzed by the program 20 to determine whether parallelization is possible, and for code that can be parallelized, one or more algorithms within that portion are adapted and then distributed to the computers on the network 4, and the results are returned to the respective adapter that issued that work for handling at the network 4. This process is repeated for a number of algorithms and for a number of subparts of specific algorithms among and between various portions 60A, 60B, etc. of the user application. Concomitantly, the lobster engine provides a management role to ensure algorithms are being processed, results are being returned, and there is a load balance in the processing of any ranges within a given portion that has been assigned to a specific adapter. As well, the execution layer 18 simultaneously monitors the resources that are available to the lobster engine to ensure that results are being returned and that confrontation integrity remains intact.

In one aspect, the invention includes a mechanism for attaching the developer's algorithms into the parallel framework. That work is performed by a set of "adapters" 10 which operate upon the portions 60a, 60b, etc. An API shields users from all parallel computing issues. The user writes call-backs that supply the main logic of the portion(s) being parallelized to the application 60. Software in accordance with the preferred embodiment uses these call-backs to drive the application, controlling work break-up, distribution to remote compute resources, and the gathering of results. Specifically, basic decomposition functions are used to break-up computational processes in the application 60 into portions that can be run independently of or dependently on one another (i.e., the portions can be individual libraries, dlls, or executables), allocating the portions to slave processors, and gathering the results to produce an answer. That work is performed by a "Lobster" engine.

In the decomposition of a program into sub-tasks, the user converts an existing application to a form more amendable to parallel processing. In the traditional approach to parallelizing a program, a developer had to decompose a function into parts that can be performed as parallel operations and then write MPI or PVM code to make the application split work into M ranges, send the ranges to each of the slaves, have the slaves process the work and send the results back to the master, and have the master receive the results and aggregate the pieces into a result. These are non-trivial tasks that burden the parallelizing process and generally restrict the applicability of the so-parallelized program to its present incarnation.

In accordance with the invention, a plurality of adapters 10 are provided to ease the parallelization process. Each adapter 10 defines a template for a specific type of problem and provides developers with a framework for adapting their applications 60 to run in parallel. The adapter framework is preferably based upon a set of object-oriented base class adapters. To enhance or extend the adapter features one can just inherit the adapter base class. The adapters 10 are callable from C++, C and other programming languages.

Figure 4:
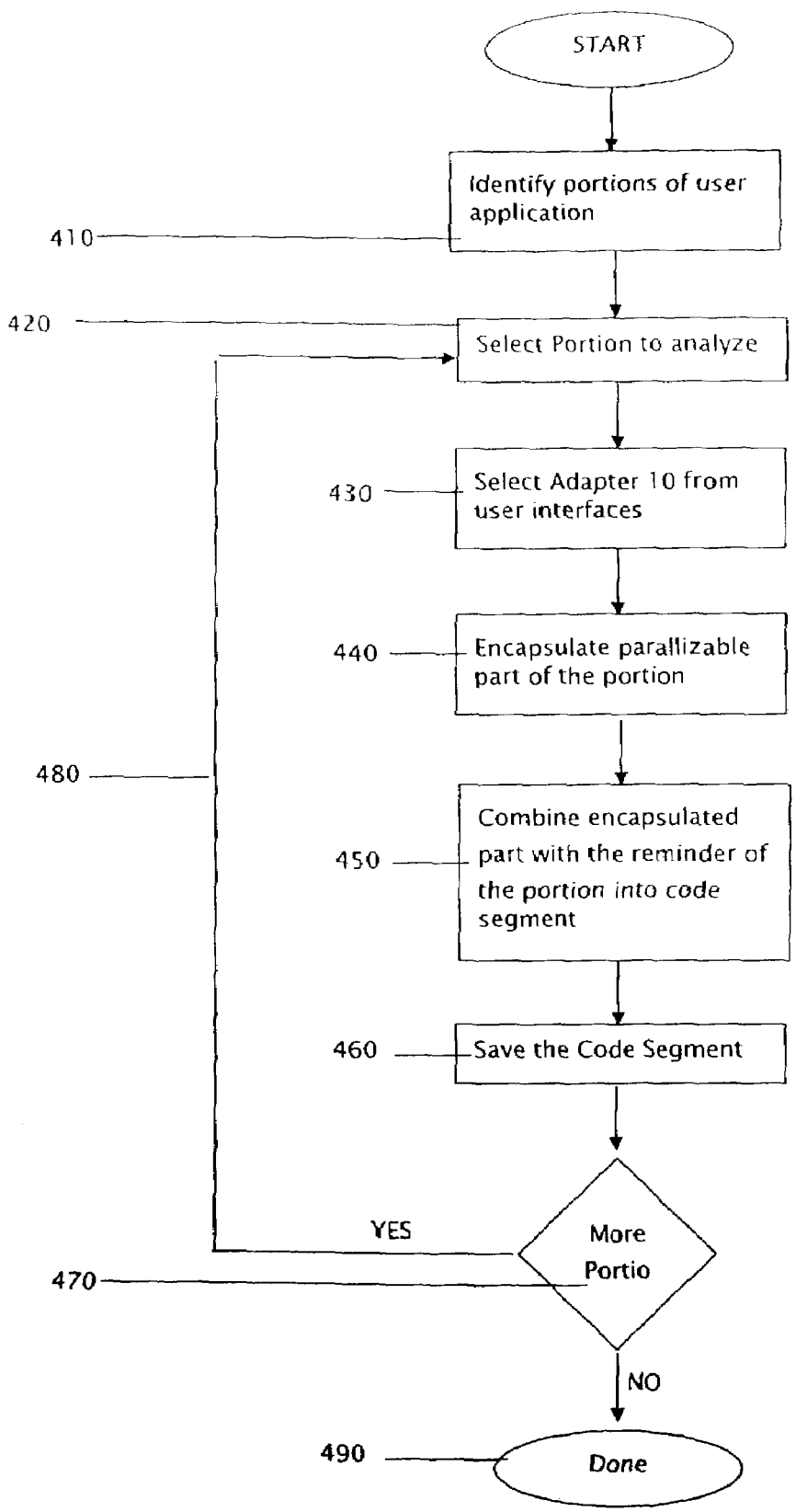
FIG. 4 is a flow chart illustrating steps taken in a preferred method for generating code segments usable in parallelized application.

With reference now to FIG. 4, a preferred process for parallelizing portions 60a, 60b, 60c, etc. of an application is described. At step 410, portions 60a, etc., within the user applications 60 are identified. The act of identifying portions of a user application are presently performed by the user through interaction with the user interface layer 24 of the program 20. The user is promoted by the interface 24 to select the adapter most appropriate to the particular algorithm presented within a given portion. It is within the scope of the present invention to utilize and agent or other intelligent module to assist the user in the selection of an appropriate adapter 10; however, the invention is not so limited. At step 420, the user selects a particular portion to analyze, say, portion 60a. At step 430, an adapter 10 is selected from the user interface 24. The selected adapter must be suitable for the particular algorithm contained within that portion 60a. As explained elsewhere, the applicability of a given adapter is a function of the computation of task presented by a given portion. By way of example, a basic for-next loop is implemented by a linear adapter 10c. The selection of the wrong adapter will cause an error log to be written to as well as verbose status information to be generated that can be useful in guiding the user to a more appropriate adapter choice.

Figure 5:
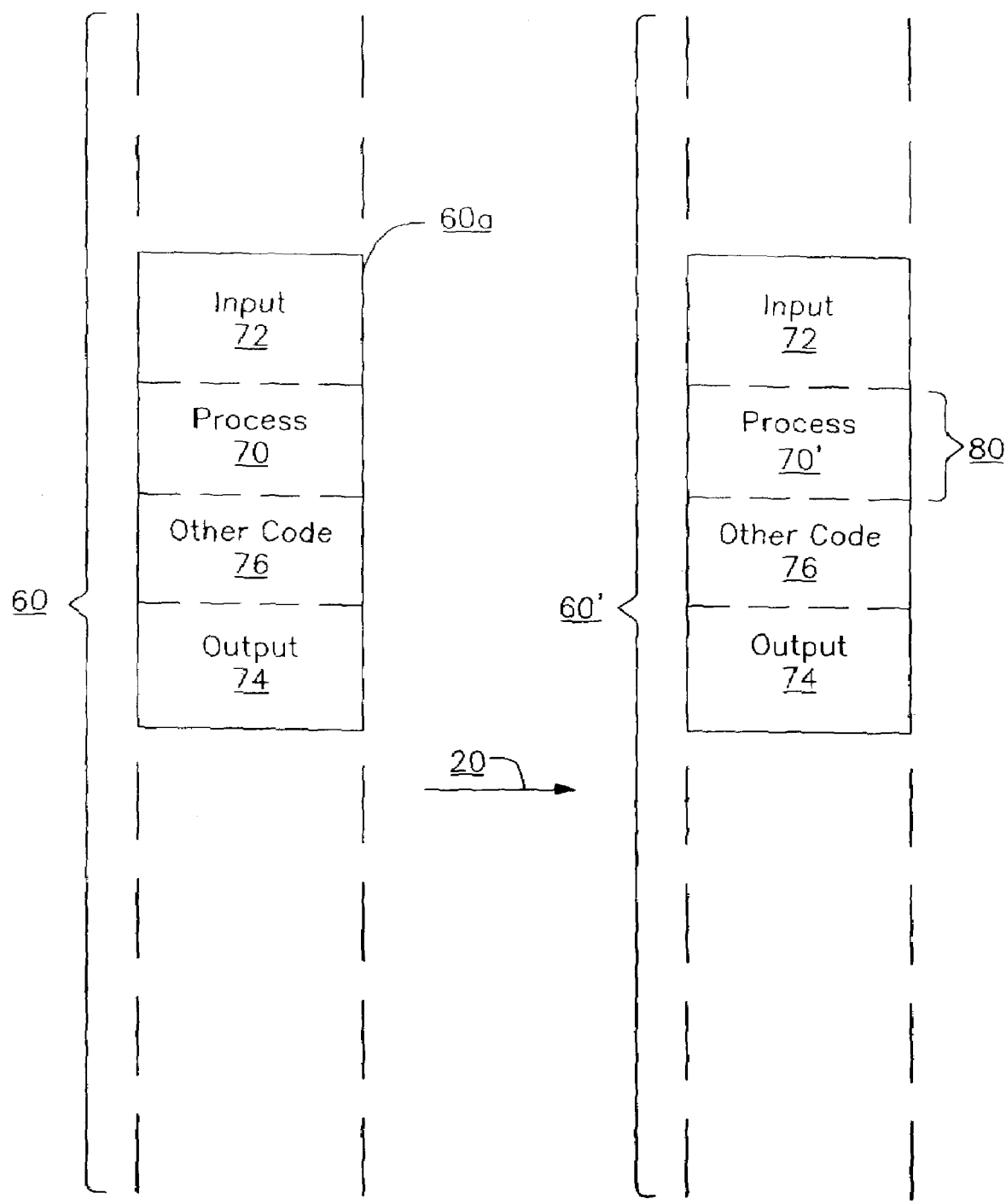
FIG. 5 is a graphic representation of an application showing its logical arrangement before and after parallelizable code segments have been generated.

Referring now to FIGS. 4 and 5, the portion 60a is illustrated as including a parallelizable process 70, inputs 72, outputs 74, and other code 76. Only the process 70 is parallelizable using the adapters 10 and so once an adapter has been selected at step 430, the parallelizable part of the portion 60a, namely, process 70, is encapsulated at step 440. The act of encapsulating the process 70 essentially comprises relocating that code into a code segment 80 which is saved and is usable by the application 60', via the call-backs to a client/server library 62 so that normal program flow can proceed. In addition, encapsulating preferably includes alterations to the variables (e.g., their definition, mapping, class, or object form) to operate properly within the adapter template.

Depending on the particular portion being parallelized, it is typical that at least some code 76 in a given portion will not be parallelizable. Preferably, that other code 76 is included with the code segment including the parallelizable code so that the bulk of the portion 60a remains a single unit. Thus, at step 450 the encapsulated parallelizable process 70' is combined with the remainder a portion 60a, namely, other code 76, into a code segment 80 that is saved to the client/server library 62 or elsewhere. The code segment 80 can be an executable, a library file, a dll, or some other file structure, saved as indicated at step 460.

At step 470, the process of parallelizing the user application 60 loops back to step 420 along arrow 480 to select another portion of the application to analyze. The process is repeated as described above until there are no more portions to analyze and save. When there are no more portions, the process ends as indicated by the arrow 490.

Referring again to FIG. 5, the user application 60 comprises multiple portions of which only portion 60a is illustrated in detail. As a result of the use of the program 20 in accordance with the preferred embodiment of the invention, a user application 60' results in which parallelizable processes such as process 70 is replaced with calls to a cross call interface layer (see FIG. 3a) that launches the respective code segments 80.

Figure 6:
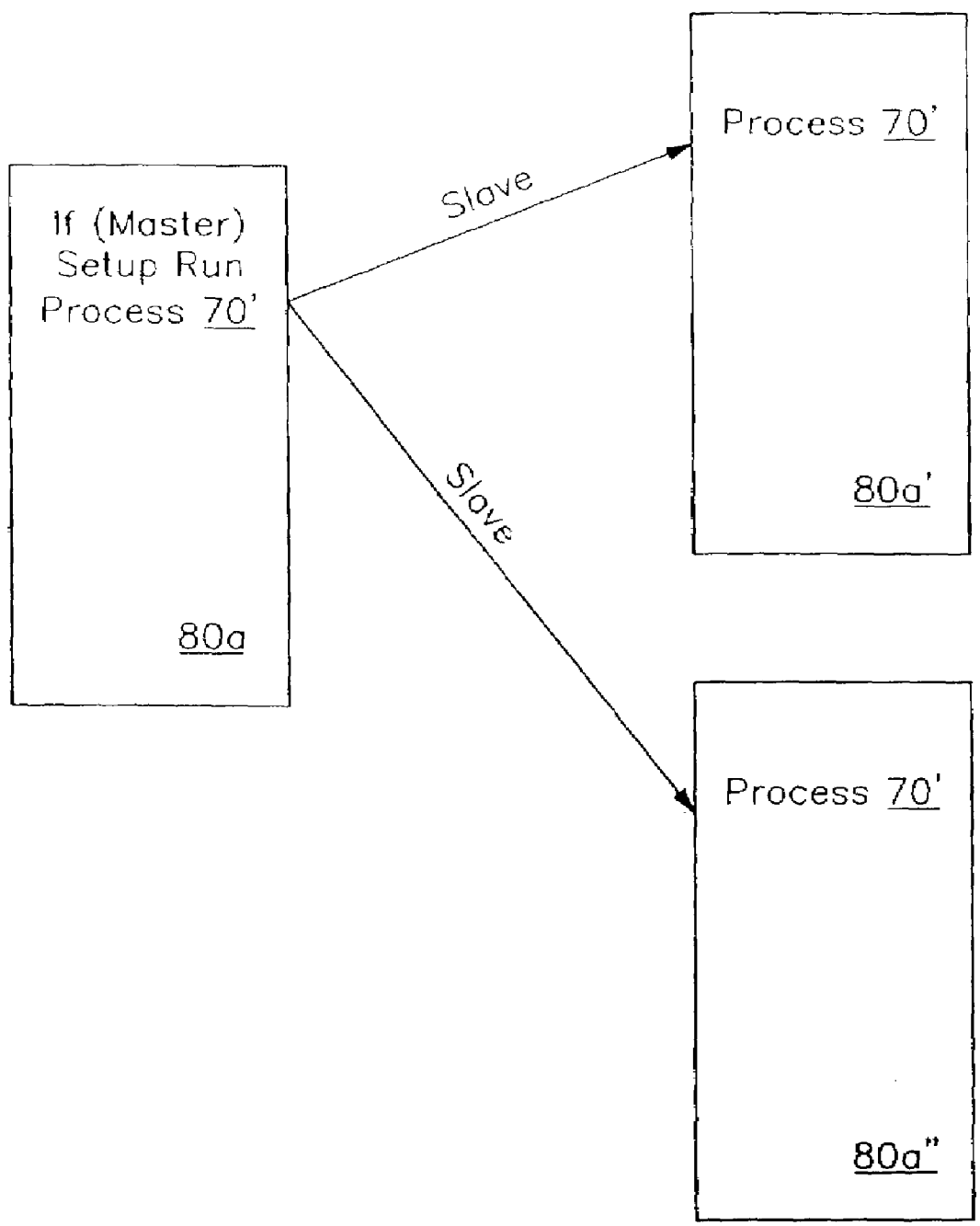
FIG. 6 is a graphic representation of master and slave code segments.

An executable code segment 80 with the linear adapter linked-in is a self-contained parallel computing object. Some code segments may not be in an executable form. In either case, the code segment can operate in one of two modes, namely, a master mode or a slave mode. In a master mode, the inputs 72 and outputs 74 are specified and the process 70 is run, whereas in the slave mode, only the process 70 is run. If code segment 80 is configured to operate in the slave mode, it is only invoked at the behest of another copy of the same code segment. Thus, as can be seen from FIG. 6, a particular code segment 80a is invoked by the Lobster engine 22 as a master or slave. Only one code segment 80a will be a master for a given application 60'. If the code segment 80a designated as the master, that segment will first conduct a set-up operation including, for example, establishing the size of the algorithm to be addressed (sometimes referred to as the "task") and obtaining the data required to commence the process (i.e., input data). In addition, the master runs multiple instances of the code segment 80a in the slave mode in accordance with resources available to the system and the problem definition at hand. Thus, for example, if two slave instances of the code segment are needed to run the algorithm, then two instances 80a' and 80a" will be invoked, with each slave instance running the process 70'. Notably, because the additional invocations of the code segment 80a are in the slave mode, they ignore any code that directs further operations for code segments that have been designated as the master (via the "if(Master)" programming construct).

EXAMPLE

Parallelizing an Application Using Adapters

In an application 60 there may be one or more portions 60a, etc., which are based on an algorithm. The algorithms may range from a "for loop" to a complex lattice which is composed of many algorithms. The goal is to identify the algorithm which is computationally and/or memory bound, and accelerate its performance without restructuring the code or changing the computational flow. Thus, for example, the linear adapter 10c replaces the standard "for loop" in a segment of the code in which the code is taking a long time to compute. The main function of code segment 80 is to process a range of the "for-loop" contained in that portion 60a, etc. For example, if the portion 60a included code such as:

```
for(i = 0 ; i < size; i++)
{
    // CODE SEGMENT
}
```

Then, the resulting code segment 80 would have the following code:

int process(const int first, const int last)

```
{
    int i;
    for(i = first ; i < = last; i++)
    {
        // CODE SEGMENT
    }
```

The goal of this example is to show how to build and run a new adapted application that calculates the mean, standard deviation, and standard error from a sequence of random numbers in parallel:

| | |
|---|---|
| 0 | .432944 |
| 1 | .764777 |
| 2 | .129836 |
| 3 | .976532 |
| . | |
| . | |
| . | |
| N | .389432 |
| Mean | .563232 |
| Std Dev | .213348 |
| Std Error | .008387 |

This type of problem is used in Monte Carlo type calculations. The challenge is generating random numbers in parallel without touching/modifying the current pseudo random number generator code. Even more, the parallel sequence should match exactly to the sequential random number generation.

This problem belongs to a general class of problems called "Linear Processing." Linear problems are very prevalent in finance, i.e., portfolio calculations and risk, matrix of risk, chains of options, volatility grids (surfaces), Monte Carlo, Complex Monte Carlo (Longstaff Schwartz), calibration/optimization, etc. The Linear adapter is used to solve the above problems and others that can be classified as "Linear."

The application 60 in this example can comprise the following code:

```
#include <iostream>
#include <cmath>
using namespace std;
//Global var
int gSize;
double gMult;
//Simple Genertor
double Random(void)
{
    return (double) rand( ) / (double) RAND_MAX;
}
void main(int argc, char **argv)
{
    //INPUT 72
    //Seed
    srand(2017L);
    //Set Data
    gSize = 200;
    gMult = 1.;
    //PROCESSING 70
    double
        SUM_CT = 0,
        SUM_CT2 = 0,
        *randArray = new double[gSize];
    for(int i = 0; i < gSize; i++)
    {
        double
            randNum = Random( ),
            CT = randNum * gMult;
        randArray[i] = CT;
        SUM_CT + = CT;
        SUM_CT2 + = CT * CT;
    }
    //OUTPUT 74
    //Calculate Stats
    double
        Mean = SUM_CT / gSize,
        StdDev = sqrt((SUM_CT2 – SUM_CT
            * Mean)/(gSize – 1)),
        StdErr = StdDev/sqrt(gSize);
    cout.precision(12);
    for(i = 0; i < gSize; i++)
    {
        cout < < i < < " " < < randArray[i] < < endl;
    }
    cout < < "Mean : " < < Mean < < endl;
    cout < < "Std Dev: " < < StdDev < < endl;
    cout < < "Std Err: " < < StdErr < < endl;
    delete [] randArray;
    return;
}
```

The code includes input 72, processing 70, and output 74 segments. In the input 72 segment, we setup the problem and data. The output 74 segment calculates the statistics and displays them. The processing 70 segment calculates and stores the random numbers and intermediate data for the output of the statistical calculations.

The linear adapter replaces the standard "for loop" in a segment of the code where it is taking a long of time to compute.

In this example, we are not replacing the processing segment 70 "for-loop" but replacing the whole sequential application 60 though that is not required; applying of the adapter to a portion of an application 60 could simply generate a code segment that is not an executable program in and of itself. Also, the I/O of the example is being replaced by classes. The steps that can be taken to achieve this were generally described in connection with FIG. 4 and are now described in further detail in the enumerated points below in an example that takes the entire portion 60a, including its inputs and outputs, and creates a code segment 80. This example, therefore, represents an embellishment on the process of FIG. 4 and the code segment 80 of FIG. 5.

1. Examine the variables in the sequential application and break them up into the common Input/Processing/Output stages in order to match up the inputs and outputs of the original code with the classes defined for the linear adapter:

```
Global:
    int gSize;
    double gMult;
Input(to Processing array):
    double
        randNum;
Output (from Processing):
    double
        SUM_CT, SUM_CT2,
        *randArray;
```

2. Next, compare the template class definition SUM_CT with the above variables CT2 (namely, gSize, gMult, randNum, randArray, SUM_CT, SUM_CT2) and create I/O classes from the sequential code. In other words, map the variables to the classes required by the selected adapter 10.

```
template < class Global,
          class InputArray,
          class Output,
          class OutputArray > class tLinear
```

Based on the above I/O variables, fill in the template classes as follows:

```
Global class:
    int gSize;
    double gMult;
InputArray class - which holds the input random number :
    double Num;
Output (Aggregation) class:
    double SUM_CT, SUM_CT2
OutputArray class - which holds the output processed
random number
    double Num;
```

Alternatively, the InputArray class and the OutputArray class can be the same class with the template defined as follows:

```
template < myGlobal,
          myInput,
          myOutput,
          myInput > class tLinear
```

3. To define the code segment 80 (here, an executable) the main entry point and the instantiation of linear adapter libraries and the Lobster libraries (namely, collectively, the client/server library 62) is achieved through the following code:

```
//Main Entry point
    int main(int argc, char** argv)
    {
        Lobster lob(&argc, &argv);
        // Input
        if(lob.isMaster( ))
        {
            my Global myG(1000, 1);
            //Assign to Master Global class
            gGlobal = myG;
        }
        Linear linear(gGlobal.get_gSize( ), lob);
        if (lob.isMaster( ))
        {
            srand(2017L);
            //Add Global class
            linear.Add_Input(gGlobal);
        }
        int status = 0;
        // Processing
        if((status = linear.Run( )) < 0)
        {
            linear.Print("Error %d @ line %d\n", status, __
            LINE__);
            return ADAPTER_FALSE;
        }
        // Output
        if (lob.isMaster( ))
        {
            myOutput StatSUM;
            linear.Get_Output(StartSUM);
            int
                gSize = gGlobal.get_gSize( );
            double
                SUM_CT = StatSUM.get_SUM_CT( ),
                SUM_CT2 = StatSUM.get_SUM_CT2( );
            double
                Mean = SUM_CT / gSize,
                StdDev = sqrt((SUM_CT2 – SUM_CT *
                Mean)/(gSize
        – 1)),
                StdErr = StdDev / sqrt(gSize);
            cout.precision(12);
            cout < < "Mean : " < < Mean < < endl;
            cout < < "Std Dev: " < < StdDev < < endl;
            cout < < "Std Err: " < < StdErr < < endl;
        }
        return ADAPTER_TRUE;
    }
```

From the above code, the main definitions of the application 60 and its Input/Processing/Output segments, have not changed. The only change is the redefinitions of the variables to classes and the Lobster and Linear adapter library (that is, the client/server libraries 62) instantiations.

4. The code segment 80 is used by the application 60' via a reference from a library. Bn Ctt the reference is known as a member function to an object such as the linear adapter template. In C, the reference is known as a call back to a library. Below is an example of a member function to implement the class global class.

```
//Global Class
myGlobal gGlobal;
int Linear::FirstProcess(myGlobal &__global)
{
    gGlobal = __global;
    return ADAPTER_TRUE;
}
//Main Entry point
int main(int argc, char** argv)
{
    Lobster lob(&argc, &argv);
    // Input
    if(lob.isMaster( ))
    {
        myGlobal myG(1000, 1);
        //Assighn to Master Global class
        gGlobal = myG;
    }
    Linear linear(gGlobal.get__gSize( ), lob);
    if (lob.isMaster( ))
    {
        srand(2017L);
        //Add Global class
        linear.Add__Input(gGlobal);
    }
    int status = 0;
    // Processing
    if((status = linear.Run( )) < 0)
    {
        linear.Print("Error %d @ line %d\n", status, __LINE__);
        return ADAPTER_FALSE;
    }
    // Output
    if (lob.isMaster( ))
    {
        myOutput StatSUM;
        linear.Get__Output(StatSUM);
        int
            gSize = gGlobal.get__gSize( );
        double
            SUM_CT  = StatSUM.get__SUM_CT( ),
            SUM_CT2 = StatSUM.get__SUM_CT2( );
        double
            Mean = SUM_CT / gSize,
            StdDev = sqrt((SUM_CT2 - SUM_CT *
            Mean)/(gSize
    - 1)),
            StdErr = StdDev / sqrt(gSize);
        cout.precision(12);
        cout < < "Mean : " < < Mean < < endl;
        cout < < "Std Dev: " < < StdDev < < endl;
        cout < < "Std Err: " < < StdErr < < endl;
    }
    return ADAPTER_TRUE;
}
```

The FirstProcess member function is the first function to be called when the code segment 80 is operating in a slave mode. The Global class is passed to instantiate all global variables—the Global class is passed in from the AddInput member function in the main part of the program.

5. The next member function, ProcessInputArray, generates random numbers so they are in the same alignment as would be provided in the sequential portion 60*a* of the application 60.

```
    double Random(void)
    {
        return (double) rand( ) / (double) RAND_MAX;
    }
```

```
int Linear::ProcessInputArray(tRArray <myInput>
&randNum,
            const int first, const int last)
{
    for(int i = first; i < = last; i++)
    {
        randNum[i] = Random( );
    }
    return ADAPTER_TRUE;
}
```

This member function is called before the main processing member function to input data during runtime. This member function always runs on a master machine—which guarantees the random numbers will match the sequential generation. The member function processes ranges, from first to last, and will fill the Input Array. The foregoing data is input dynamically but in a different implementation could be coded so as to populate the input array using a static input range.

6. The next member function, ProcessInputRanges, processes the range of the "for-loop." The input to the function is the InputArray, and the output is the aggregation class on the one hand and the output processed random number on the other:

```
int Linear::ProccesInputRanges(tRArray <myInput>
&randNumArray,
            myOutput &Range_StatSUM,
        tRArray <myInput> &randArray,
            const int first, const int last)
{
    int
        range_i;
    double
        gMult = gGlobal.get__gMult( );
    Range_StatSUM = 0.;
    for (range_i = first; range_i < = last; range_i++)
    {
        double randNum = randNumArray[range_i].get__Num( );
        double CT    = randNum * gMult;
        randArray[range_i] = CT;
        Range_StatSUM    += CT;
        // report progress
        if (!Progress(range_i, last))
        {
            return -1;
        }
    }
    return ADAPTER_TRUE;
}
```

The above code in the "for-loop" matches the sequential code with respect to processing the random number, storing it in the array, and aggregating the resulting numbers for the statistical calculation in the output. This membership function is run on the slave.

Further, there is a load balancing call, Progress, that informs the lobster engine 22 of the state of the processing loop. This information is used to dynamically load balance the algorithm being executed by code segment 80. This function can be user-defined to help the Lobster engine 22 dynamically load balance the algorithm.

7. The next member function, ProcessOutputRanges, is the main aggregation function which has, as inputs, the main aggregation class, the range aggregation and the OutputArray range received from the ProcessInputRanges function. The ProcessOutputRanges function runs on master machine.

```
int Linear::ProccesOutputRanges(myOutput &StatSUM,
            my Output &Rang_StatSUM,
            tRArray <myInput> &randArray,
            const int first, const int last)
{
    StatSUM += Range_StatSUM;
    return ADAPTER_TRUE;
}
```

To make the adapter 10 calculate the statistics required by code segment 80, all that is required is a call to the member function, linear.Get_Output, which gets the main aggregation class (which was aggregated in the ProccesOutputRanges function). Below is the ouput segment of the call segment 80.

```
if (lob.isMaster( ))
{
    myOutput StatSUM;
    linear.Get_Output(StatSUM);
    int
        gSize = gGlobal.get_gSize( );
    double
        SUM_CT = StatSUM.get_SUM_CT( ),
        SUM_CT2 = StatSUM.get_SUM_CT2( );
    double
        Mean = SUM_CT / gSize,
        StdDev = sqrt((SUM_CT2 - SUM_CT *
        Mean)/(gSize - 1)),
        StdErr = StdDev / sqrt(gSize);
    cout.precision(12);
    cout << "Mean : " << Mean << endl;
    cout << "Std Dev: " << StdDev << endl;
    cout << "Std Err: " << StdErr << endl;
}
```

The user selects adapters for each algorithm in the application 60 that they wish to parallelize. The choice of adapters includes simple parametric systems (in which the problem is composed of a series of tasks which can be processed independently, much like SETI@home-type calculations), and complex tree-structured recursive systems in which all of the computations are interdependent and intertwined (typical of financial models, pharmaceutical modeling, weather modeling, and other real-world problems). Should the user be unable to use one of the adapters in set 10 to achieve algorithm parallelization, an adapter SDK (System Developer's Kit) 12 is provided to permit the user to formulate an appropriate adapter.

The developer does not try to design or implement a parallel algorithm. Rather he uses the adapter API to hook in the logic of his existing algorithm in such as way that Lobster has the ability to execute the component parts of the algorithm. Adapter API's are designed to allow these algorithm components to be expressed to Lobster in the most direct and simplest fashion.

The key components of the program 20 are the adapters 10 and the Lobster engine 22.

Adapters are the software architecture that manage the specific requirements of parallel computing for different types of algorithms. The invention provides customizable object or class libraries for different types of algorithm structures. The adapters preferably are embodied as customizable-object client/server libraries 62 or class libraries of algorithms and quantitative methods that form a basis for a parallel application. Each Adapter defines a template for a specific type of algorithm and provides developers with a framework for adapting their applications to run in parallel by hooking (i.e., including )the logic of the algorithm to be parallelized into the template. The adapter framework is preferably based upon a set of object-oriented, general-purpose algorithmically parallelized base class adapters. To enhance or extend the adapter features one can just inherit the Adapter base class.

The adapter software forms the high level control structure of the algorithm, with the constituent elements being encapsulated in functions and data passed through function parameters such that these elements can be executed on remote computers.

Lobster (Load Balancing Sub-Task ExecuteR)

The program 10 uses an underlying distributed framework called Lobster (Load Balancing Sub-Task ExecuteR). Lobster is a workload manager, and manages all the generic management issues in an application. It takes responsibility for a piece of work and ensures that it gets completed using available resources with full fault tolerance and efficient load balancing, leading to a very efficient speedup in processing the application 60'.

Lobster is an integrated mechanism to distribute portions 60a, 60b, etc., that is, slices of a computation, across a network of computational resources (such as a collection of Linux boxes, Suns, mainframes, whatever) to ensure that each portion of a program is completed using available resources and to ensure that fail-over, recovery, and other critical services are managed on behalf of the application. Lobster treats each part of the algorithm as a portion that can be transferred to another machine in case of failure or in case more resources become available.

Lobster controls the amount of parallel computation dynamically in response to the direct computational complexity of the application. For example, the Linear Adapter 10C can be used to interpret the internal structure of an application for traditional or hybrid approaches to parametric computing. Lobster then controls the amount of parallel computation dynamically in response to the computational depth of the application as determined by the linear adapter's having parsed through the algorithms within the developer's application and separated them into multiple portions each having an associated time-step for execution. Control is manifested by Lobster allocating these portions directly in view of the time-step of each portion and indirectly in view of and/or in response to resource utilization (e.g., how slowly is the portion running on the allocated machine).

Lobster provides the functionality to easily convert existing algorithm-based applications into parallelizable applications by handling the mapping, load balancing, fault tolerance and scalability. Specifically, converting algorithms into parallel algorithms involves: dynamic parsing of algorithms (in contrast to applications) into multiple pieces; mapping and distributing the algorithm pieces to different network machines; balancing the allocation of the distributed algorithm pieces; creating fault tolerance for the distributed algorithm pieces; and managing system errors. Lobster holds problem data in a "pool"; requests parsing of problems by sub-task size selected for load balancing; maps sub-tasks to machines; handles fault tolerance; and provides task termination (e.g. upon lack of progress). In this way, Lobster exploits the appropriate level of parallelism for a given situation by intelligently distributing the workloads to the most efficient processors.

Lobster takes full advantage of existing middleware such as MPI, as can be appreciated from the following example.

Figure 3:
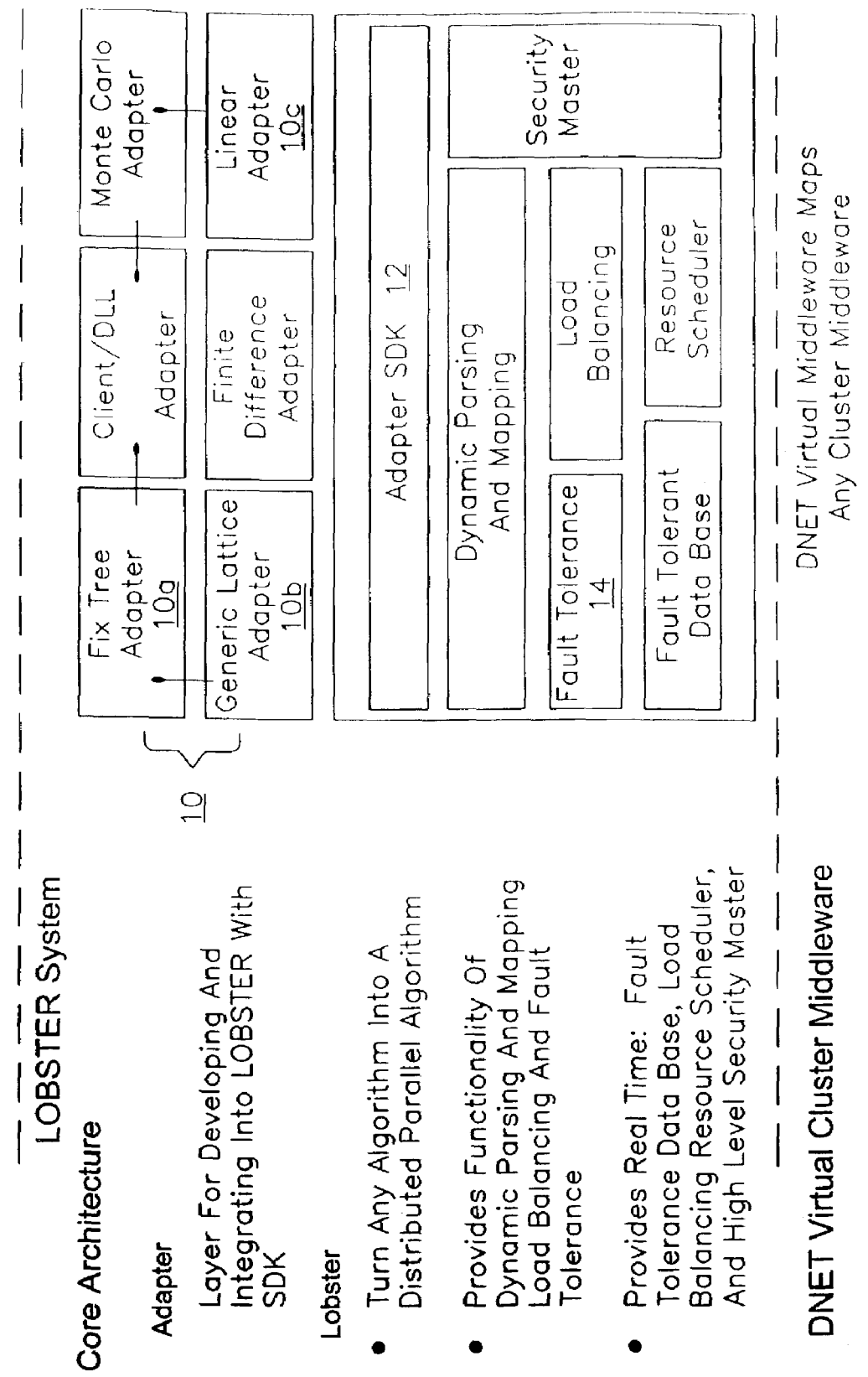
FIG. 3 is a graphic representation of the core architecture for parallel computing system embodying the present invention.
Figure 3A:
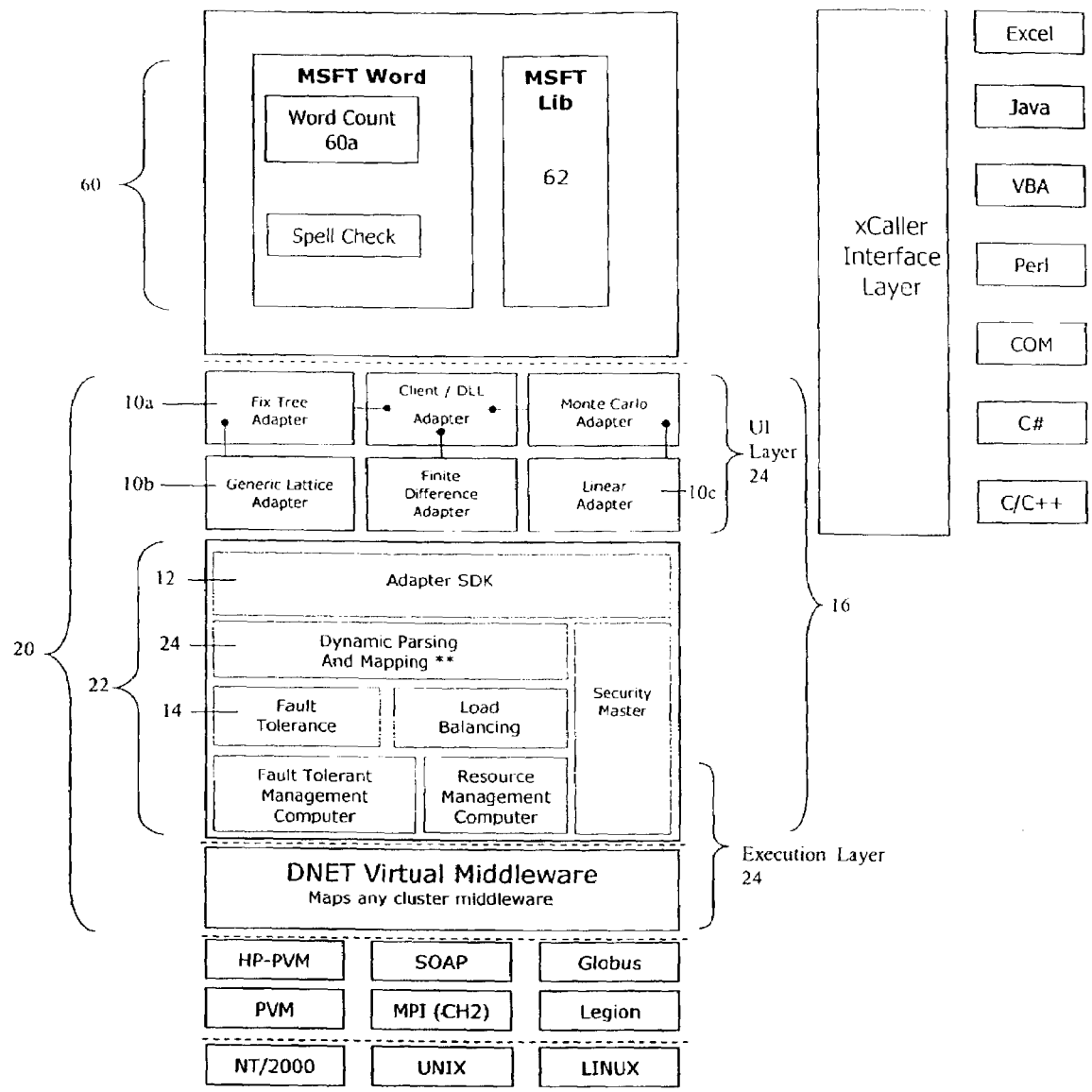
FIG. 3a is a graphic representation of the architecture for a parallelizing and parallel-operating computing system in accordance with a presently preferred embodiment.

FIG. 3 is a graphical representation of the core architecture of the program 20 embodying the present invention. A lobster engine 22 handles all generic parallel computing issues. Pieces of work are inserted into the system, allocated to remote computers 1, 2, 3, etc. for processing, and the results are returned to the master for presentation to the next layer of software. All work comprises anonymous, unstructured blocks of memory. The lobster engine 22 can not manipulate the work in any way itself, except for sending it over the network 4 to remote computers. The core parallel-computing requirements that apply to all types of problems, such as splitting of work, allocating work to remote computers, load balancing and fault tolerance are all handled by the engine 22 and are therefore available for all problem/algorithm types.

The work required by each code segment 80 must be manipulated through externally 'plugged in' routines which are designed to handle specific problem structure, e.g., linear or tree structured problems. Whenever the lobster engine 22 needs work to be split into small sections, for results of tasks to be aggregated or otherwise handled, or for a piece of work to be processed to produce a result, these routines are called to do the work. These data handling routines are in the adapter. The linear adapter acts as an agent to the lobster engine 22 for manipulating linear type problems on request. Likewise the tree adapter acts as an agent for manipulating tree structured problems on request.

Any concept specific to an adapter, such as the linear adapter aggregate mechanism are present only in the adapter code. Issues relating to work allocation, load balancing etc, are present only in the lobster code. The joining of these two layers creates a powerfully efficient and extendable framework for developing parallel applications.

The adapters manipulate a number of specific data types. The core lobster engine also manipulates a number of specific data types, though not the same ones as the adapter. A fundamental aspect of the the architecture of program 20 is that the lobster engine 22 does not need to know the adapters' data. Rather it treats the information that it works with as anonymous chunks of data, always using the adapter's functions to manipulate the data, as required. For convenience, the same terms are used in describing the adapter and the core lobster engine.

We now describe the operation of the lobster engine 22 when used with a linear adapter 10c and a fix tree adapter 10a. To facilitate the following discussion, the following data types are employed:

No_of_tasks—the number of pieces of discrete work which compose the problem

Root—scalar: a constant specified at initialization, made available to all slaves and fed into all functions for reference. It carries global problem information Input_array—array: optional array specifying one input data element for each task. These are specified by the user and form the input data to the algorithm Results_array—array: array of results, one data element for each task. These are the output from the algorithm.

First & Last—coordinates describe a range of tasks. 0>=first>=last>=No_of_tasks-1

Aggregate—scalar: memory containing an aggregation of an array of results

Aggregate_array—array: this is an array of aggregates. Individual aggregates are returned (optionally) by slaves and are an aggregation of the results of the tasks processed by that slave task list. (Each slave processes many separate lists of tasks in its lifetime). The aggregate array is the total list of aggregate, is of arbitary length, and is presented to the user's master process through Linear_GetResults, ready to be aggregated into a single aggregate.

The lobster engine 22 itself has data types, including a Task which is composed of a Task_list (i.e., a list of tasks to be processed) and a Result_list (i.e., a list of results of processed tasks), and a Global data which is given to each slave. The Global data maps to the linear adapter's root data.

We use "&" to signify an output parameter in function calls.

The short code example illustrates the parallelization of a simple multiplication program that the adapter 10 operates upon. It multiplies every element of any array by 7.

```
Function: User_application( )
{
    setup input array
    For (I=0; I<20; I++) {
        Result[I] = Input[I] * 7;
        Aggregate += Results[I];
    }
    Output result array
}
```

The "for" loop processes every element of the array independently, with a simple mapping from inputs to outputs, and totals the resultant values. The lines of code in the "for" loop are moved into a separate function which is hooked into the linear adapter 10c. This allows the lobster engine 22 to call this function on any slave computer on the remote network 4. The application 60 sets up the adapter at the main entry points, telling it how many tasks our algorithm includes (namely, 20 in this example), how many passes there are in the input array, and then tells the lobster engine to run the code segment 80.

Thus, when rewritten to utilize the linear adapter, the function "UserApplication( )" now reads as follows:

Function: User Application( )

```
{
    ...
    id = getID( );
    if (id == master)
    {
        Initialize root node and input data array[20]
        call Linear_setup(tasks = 20, root_node, input_array)
    }
    call Linear_run( )
    if (id == master)
    {
        call Linear_GetResults(&results_array,
            &aggregate_array)
        print results
    }
}
```

// The following user routine will be called by slave processes. It generates corresponding // results in the results_array for each element of the input_array Function: process(root, input_array, & result_array, & aggregate, first, last)

```
{
    zero aggregate
    loop from first to last
    {
        results_array[loop] = input_array[loop] * 7
        total results_Array[loop] into aggregate
```

```
            // Tell slave lobster library how much work
            // we have done.
            // This is part of the extrapolation load
            // balancing mechanism
            call PROGRESS(loop)
        }
    }
```

So far, we have adapted a simple multiplication program to utilize the adapters of the present invention. When executed, the function "UserApplication( )" calls another adapter function, namely "Linear_Run( )" or "Fix-Tree_Run", for example. Regardless of which adapter function is called, these latter functions invoke one of two lobster functions through a callback (or membership function), depending on whether the invoking code segment is a master or a slave. Exemplary calls are shown below.

```
            // Solve problem
            Function: Linear_run( )
            {
                if (I am the master)
                {
                    call master_run( )
                }
                else
                }
                    call slave_run( )
                }
            }
            // Solve problem
            Function: FixTree_run( )
            {
                if (I am the master)
                {
                    call master_run( )
                }
                else
                }
                    call slave_run( )
                }
            }
```

Turning next to the lobster engine 22, that engine operates through callback functions installed by each caller (i.,e., each adapter 10) to implement a parallelized process.

The lobster engine 22 is based on conventional process-farm techniques. Work is held in a pool on a master process. Slave processes are allocated more work on a first come-first served basis as they become low on work. Slaves request more work from the master once they have completed processing of, say, 75% of the current work load. By requesting more work before the current work load process as completed, a new block of work will be received before the current one has finished processing. Thus communications and processes are overlapped and the slaves do not lose time waiting for messages from the master process.

The work pool contains a list of chunks of work, each with a clearly defined size. Where possible, existing chunks of work are allocated intact from the pool to slave processes. Where this is not possible, a piece of work is split down to the required size, using the adapters' split function, i.e., a function that responds to a reference that originates with the lobster engine 22, say, to provide the lobster with work. More particularly, the lobster engine 22, through its dynamic parsing and mapping functionality 24, can issue a generic split request which causes different ones of the adapters (e.g., adapters 10a or 10c) to respond with their associated, respective split function (i.e., process, process array or process subtree). Unlike the conventional process-farm approach, lobster does not request that work be split until there is a run-time need for a small piece of work to be broken off. This means that work is split with knowledge of the specific volume of work that has to be split. This allows for an infinite granularity of work splitting and, thus, of load balancing.

Any splitting is coupled with an accurate load balancing mathematics which, provided with information about the speed and current amount of work on each of the slave processes, can split work in such a way that all slave processors will finish processing the problem at exactly the same time, providing an ideal optimum load balanced performance.

The load-balanced algorithm is kept informed of the speed and progress of each slave with a regular periodic message that is sent from each slave to the master. If appropriate, the adapter will provide the user application with API mechanisms that allow the user to keep the adapter informed about the volume of work that has been processed. The adapter can then provide this information to the slave Lobster component, which in turn can send that information to the master.

In order to take advantage of dynamic environments, Lobster allows machines to be added or removed seamlessly. New machines can be added to the application while it is running, and failed tasks can be replaced. Work is simply moved in and out of a 'work to do' queue on the master process. Lobster ensures that all necessary problem data is available to a new computer that joins the cluster part way through execution. Lobster operates in heterogeneous computing environments, and handles conversion of data between different computer architectures.

Lobster sends 'global' problem data to each of the slave processes. This is constant data common to the algorithm that all slaves may need access to. The adapter also uses this core lobster feature to send master-side adapter information to the slave-side adapter library 62.

To provide load balancing, a conventional process farm is used with very large work sections, reducing network traffic. The final allocation of work to each process is performed by carefully sizing each task so that all processes complete work at precisely the same time. This is achieved through extrapolation based on machine performance and monitoring of the amount of work still unprocessed on each machine. Work is recalled dynamically from slave processes to correct imbalances in the load, as Lobster continually reassesses the environment using algorithms to optimize performance at any given point in time.

Lobster also provides fault tolerance and manages fault tolerance using a process that cooperates with a fault tolerant database 14 of the tasks that it monitors. When a slave task dies, that piece of the application is automatically rerouted to one of the remaining processors so that its work goes back into the pool. When the master dies, the slaves close down. If a slave stalls, the master detects this using progress counter, with the application periodically indicating its progress. If the master does not receive the slaves progress update message within a pre-set period of time, the slave is assumed to have stalled and it is removed from the system. If a slave dies or is removed, its work is retuned to the work pool to be allocated to other slave(s). If the master stalls, a thread detects the lack of progress and kills it. For example, slave processes detect this using a timeout mechanism based on a keep alive message that is periodically sent to the slaves from the master. Partially processed results are delivered to the master task for processing. I.e., unit of results delivery is independent of the unit of work allocation/load balancing. Dead tasks on machines are repaired in a PVM type environment. Error logs and overall status information are created by the software. A configuration file is used to allow the user to control various aspects of software execution.

Scalability is provided through an automatically applied construction of a hierarchy of sub-master processes, each supervising a group of slave tasks.

Problems are submitted to the system and held in a queue. They are allocated to groups of machines in a cluster, whether on dedicated or non-dedicated networks, as machines become available. The size of clusters can vary dynamically and Lobster will add or remove these machines from its cluster. Scheduling can occur over a single communications cluster, or LSF style by providing a different cluster instance for each application.

The parallel environment can be monitored, configured and controlled centrally. Software is automatically uploaded and the environment (files and environmental variables) automatically configured as needed. Applications are cached on machines commonly used for cluster computing. Overhead left behind by a terminated application is tidied by the system. All results, error reports and performance information are available in the system. Errors and performance statistics are gathered and can be routed to appropriate people, through email or internal mechanics, e.g., users, administrators, and ourselves.

Below, we provide pseudocode for a lobster engine 22.

```
Master
// Set-up problem - master side
// The initial input_list is a description of the entire problem that must be solved.
// It has an associated size. For a linear adapter, this will be the number of tasks
// in the problem. For trees, it is an arbitrarily high value representing the relative
// size of the whole tree. The next operation(s) to be carried out of this input node
// will be to apply the adapter's split function to break it down into sections.
Function: Master_setup(global, initial input_list)
{
    store global data for later distribution to slaves
    Set in-put_list into work pool
}
// Solve problem - master side. Once run by the adapter's run function, this will
// solve the problem, by iteratively breaking sections of work and sending them
// to slaves, and receiving results from the slaves. The problem can not be
// manipulated in any way except through the adapter's split (on master) and
// process (on slave) functions. The master works with task_lists and results_list
// which are linked lists of anonomous blocks of memory, supplied by, distributed for,
// manipulated by, and ultimately returned to, the adapter.
Function: Master_run( )
{
    Initialize
    Send global to all slaves
    Call Calculate_load_balanced_work_allocations( )
    Loop through slaves,
    {
        Call dispatch_work_to_slave( ) to send first block of work to each slave
    }
    Loop until (all work is complete)
    {
        Receive message from slave
        Act on message:
        If message is 'slave is low on work'
            Call dispatch_work_to_slave( ) to send first block of work to each
                slave
        If message is 'results received from slave'
            Unpack results_list from message
            Call adapter_receive_results(results_list) and pass results to adapter
    for storage, processing or passing to user
        If message is 'slave progress update'
            Keep record of slave progress for use in load balance calculations
        If message is 'machine lost'
            Push data from that machine back into work pool
    }
}
// Calculate ideal volume of work to give to slaves in future work allocations
Function: load balanced work allocations( )
{
    Extrapolate each slaves progress based on last reported progress and speed
    Calculate amount of work to give to each slave so they will finish at the same time
}
// Build task_list and send to slave. The load balancing logic has determined how
// much work should be given to each slave. This is a purely numeric process.
// i.e, x% of the work pool should be allocated to each slave. This function must
// run through the list of available blocks of work, each of which has associated with
// it a volume, and decide which blocks to send to the slave. If the required volume
// can not be met through the consecutive sequence of nodes, then the node is
// split into the parts, the first part being the amount needed to complete the volume
// about to be dispatched to the slave and the other half is the remainder
```

-continued

```
Function: Dispatch_work_to_slave( )
{
    Lookup what quantity of work from the pool must be passed to the slave
    New slave task_list
    Loop through pool until we have enough work for the slave
    {
        If piece of work is smaller than required amount
        {
            Remove task from pool
            Add task to slave task_list
            Call Adapter_get_input_array(&input_array) and add to task_list
        }
        else
        {
            // Split chunk of work up according to required amount
            Remove task from pool
            Call adapter_split_function(task, new_task_list, remaining_task_list)
            Add new_task_list (the broken off section of work) to slaves
                task_list
            Add remainig_task_list_back into work pool
            call Adapter_get_input_array(&input_array)
            and add to slaves task_list
        }
    }
    Send the task_list to slave
}
Slave
// Run problem - slave side
Function: Slave_run( )
{
    Initialise
    Receive and store global data from master
    Give global to adapter
    Loop until master tells us to finish
    {
        Get message
        Act on message
        If message is 'master has finished'
            Return from slave_run
        If message is 'new work has arrive'
            Unpack task to first, last, input_array
            Loop through tasks
            {
                Call adapter_process(task_list, results_list) callback to process work
            ]
            Send results_list to master
    }
}
// Called by user to indicate progress made with the task_list being worked on
Function: PROGRESS(progress)
{
    Send message to master to indicate the slave progress to the lobster engine 22.
}
```

Finally, a brief discussion of how the adapters 10 interface with the lobster API is provided.

Each of the adapters 10 must present an interface to the lobster engine 22. This includes inserting an initial block of work into the system, providing a split function to breakup work into sections and a receive_results function to accept results that are returned by the master lobster library. The split function for linear problem is a trivial co-ordinate and memory manipulation routine. The receive_results functions must store received results and aggregate them in an array ready for later retrieval by the user. Additional optional user application callbacks may be installed to provide input_array data and receive_results on demand as the lobster executes the problem. These can lead to improvements in performance and memory requirements.

In the following pseudocode, various calls by the user application 60' invoke processes within the adapters 10 that, in turn, cause the lobster engine 22 to initiate and manipulate the code segment 80. Likewise, some calls can be from the lobster itself to an adapter 10 which, in turn, cause the lobster engine 22 to initiate and manipulate the code segment 80.

```
Master Run-Time Mode
// Called by user to set-up problem
Function: Linear_setup(no_of_tasks, root, input_array)
{
    Store setup parameters for use in the adapter
    Set input_array and first, last coordinates into initialize signel
    node task_list
    // root becomes the master's global data
    Call Master_setup(root, task_list)
}
// Called by master lobster to request breakdown of a piece of work
Function: Adapter_split_function(task, % to split, output_task_list,
remaining_task_list)
{
    split requested volume from task
```

-continued

```
    split into two parts, the output_task_list being of volume X and the
remaining_task_List holding the rest
}
// Called by master lobster to present results back to adapter
Function: Adapter_receive_results_function(task_list, results_list)
{
    Decode task description (first and last coordinates) from task_list
    Decode corresponding results from results_list - separating
        aggregate and
results_array
    Store results_array at correct location in adapter's overall array
    Store aggregate in adapter's overall aggregate array
}
// Called by user to retrieve results after processing has finished
Function: Linear_GetReults(&results_array, &aggregate)
{
    Return results array and aggregates_array to user
}
// Called by master lobster to retrieve input array
// data prior to dispatch task_list to slave
Function: Adapter_get_input_array(&input_array)
{
    Copy user specified input_array into parameter
}
Slave Run-Time Mode
:
// Process task_list on the slave using the users process function
Function: Adapter_process_function(task_list, &results_list)
{
    Extract coordinates (first, last) from task_list
    Extract input_array from task_list
    Allocate results_array
    Call user_process_function(root, input_array, &results_array,
        &aggregate, first, last)
    Set results_array into results_list
    Set aggregate into results_list
}
```

The foregoing discussion largely concerned the linear adapter. As another example, a tree adapter can be used to allow tree-structured problems to be solved. Tree problems are defined by a single initial root node, which can then be broken down into a finite number of children, each of which is itself a tree. Parsing the tree data structure is performed through application of a user supplied split function which can split a node into its constituent children nodes. The tree adapter callback functions are used to split and merge sub-trees and process leaf nodes, or whole sub-trees. The tree adapter handles all administration needed to track dependencies between sub-trees. The tree is split into variable sized sub-trees rather than split completely to a fixed depth. This reduces the number of split operations that are required and maximizes performance. An optional user routine is allowed for processing bottom row sub-trees of depth 2.

The whole algorithm can be mapped to a single data structure or split into input, output and 'merge' data. Merge data is generated in a node split and fed through to a node merge, without passing though the process function. Trees are processed either by the client application or by an interactive stack-array based algorithm, which traverses the tree, solving through the client's leaf processing function.

The following pseudocode is specific to the use of tree adapters and invokes the lobster engine, either when the adapter is in a master or slave run-time mode.

```
Master Run-Time Mode
// Called by user - setup fixed tree problem
Function: FixTree_setup( )
```

-continued

```
{
    Store setup parameters
}
// Called by master lobster to breakdown a problem
Function: Adapter_split_function(task_list, &new_task_list,
&remaining_task_list)
{
    Traverse tree using user split callback to split nodes
    Return sub-lists in two lists, the broken off
        section and the remainder
}
// Called by master lobster to receive results that come back from slaves
Function: Adapter_receive_results(results_list)
{
    Slot results into list
    When all siblings are present
        Call user merge function to produce a results
        from the child results
    When root results is produced, store it
}
// Called by user to retrieve results after problem is solved
Function: FixTree_GetResult(&root)
{
    Return root result
}
Slave Run-Time Mode
Function: Adapter_process_function(input_array,
&results_array)
{
    Traverse tree, processing to completion, calling
    user split, merge and process
callbacks
}
```

The fixed tree adapter 10A presents an API ideal for handling tree structured (e.g., recursive math) problems. In selecting an appropriate adapter 10 for a given algorithm to be parallelized, the benefits and tradeoffs of a given adapter are considered as they apply to a given algorithm type.

The user problem is handled indirectly through callback functions to split and merge sub-trees and process leaf nodes, or whole sub-trees. The problem structure (tree node) is implemented in the client application giving Lobster complete freedom from application specifics. In the tree specific split, process and merge functionality are provided as services to the lower level generic core-lobster system, which in turn drives the problem solving process using these routines. The tree adapter handles all administration needed to track dependencies between sub-trees. The tree is split into variable sized sub-trees rather than split completely to a fixed level allowing for very efficient splitting. The adapter handles memory allocation of nodes for splitting. Trees may be pruned midway through processing. An optional user routine is allowed for processing bottom row sub-trees of depth 2. The whole problem can be mapped to a single data structure or split into input, output and 'merge' data. Merge data is generated in a node split and fed through to a node merge, without passing though the process function. Trees are processed either by the client application or by an interactive stack-array based algorithm, which traverses the tree, solving through the client's leaf processing function. Static global problem data is accepted from the master task and distributed to each slave as it starts up.

Figure 7:
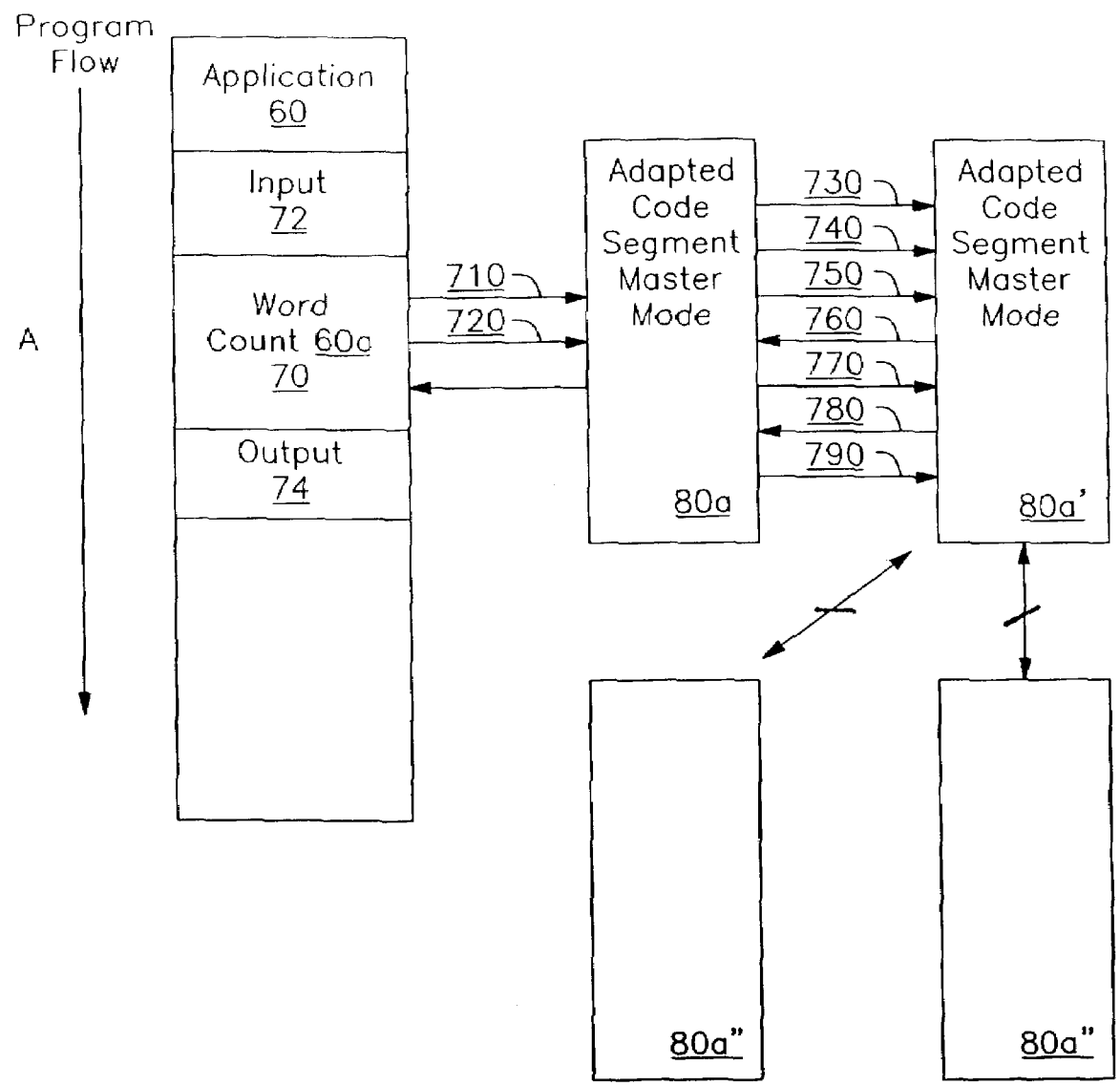
FIG. 7 is a graphic representation of multiple code segments in a hierarchical arrangement illustrating the single- and dual-mode capabilities of servers in accordance with the preferred embodiment.

Referring now to FIG. 7, the general scheme utilized in launching a parallelized application is illustrated in connection with an application 60 that utilizes a linear adapter in order to perform a word count of text in a data file, via a portion 60a of the application. The application 60 has a program flow as indicated by the arrow A. During the course of the execution of the application, the crosscaller (client)

interface is instantiated with the name of the adapter used to implement portion 60a (which, in this case, is a linear adapter). Also, input data objects including, for example, a Global object and an array, are sent through the xcaller (which in this example include the number of paragraphs; input array of paragraphs; etc.). The xcaller uses the adapter name to launch the adapted (that is, parallelized version of the) code segment 80a. These steps are indicated by arrow 710.

The Adapted code segment 80a is launched on a first resource available to the application 60. That resource can be the same or another processor resident on the machine that is executing application 60, or can be another machine connected via a network 4. The lobster object is instantiated in the code segment 80a, as indicated by arrow 720. In part, this includes determining if the lobster object is operating on a server in a master mode or a slave mode. Since this instance is the first lobster instance, the lobster resident in the code segment 80a is a server operating in a master mode ("master server"). The adapter object of code segment 80a instantiates the xcaller and then receives the input data. Then a linear adapter 10c is instantiated (in this example) with the operating parameter being the size of the array to process, i.e., the number of paragraphs to analyze, the text of the paragraphs, etc.). This global input data is added so that it can be made available to any processes that are to handle the portion 60a, namely, each code segment 80a, whether it be a master or a slave.

With the set-up of the master code segment 80a complete, the lobster can execute the processes necessary to implement the algorithm at hand, here, the word count routine. To do this, the lobster launches at least one copy of the adapted code on a different resource, for example, a different processor or a different machine on the network 4. This is indicated by arrow 730, which causes another instance of the code segment 80a to be instantiated as code segment 80a'.

As shown by arrow 740, the new instance code segment 80a' instantiates itself with the lobster and adapter objects. Before the lobster is instantiated, the code segment 80a' comprises a stateless sever ready to assume either a master mode of operation or a slave mode of operation. The code segment 80a', and more generally, the replicated code segments that are used in this invention are intelligent workers insofar as they have their own capacity to determine, in response to parameters passed to them and operating conditions in the network in which they reside, the optimum mode for their respective operation. In part, this enables load balancing and fault tolerance among the active segment in real-time.

Once the lobster and adapter objects are instantiated, the code segment 80a' operates either (1) in a single mode in which it serves as a slave to the code segment 80a master, or (2) in a dual mode in which it servers both as a slave to the code segment 80a master and also as a master to further code segments 80a" that are later instantiated by the code segment 80a' in order to assist 80a' in processing a portion of work. The dual mode of operation generally has applicability whenever the adapter object is not a linear algorithm. The code segment 80a' then runs, ready to process a portion of work that is to be provided to it.

Arrow 750 illustrates a first callback by which the master code segment 80a can send any global input data to each of the instantiated slave servers 80a' (only one shown in FIG. 7), if such data exists. This data is sent to all slaves because each slave needs that information operate on the algorithm.

Arrow 760 illustrates a second callback by the code segment 80a' to which the master code segment 80a responds with data to be processed, if it exists. The data could be an input array on the other hand, or can be streamed (e.g., on-the-fly) data from a conventional data feed (e.g., real-time stock price data, weather, etc.).

Arrow 770 illustrates the callback to initiate the processing and aggregation of data concerning the problem at hand (e.g., the counting and totaling of words in the file). In part, this includes Progress reports made by the adapter object in the code segment 80a'. In the meantime, the code segment 80a is monitoring the progress report and distributes additional portions of the work in the pool to the code segement(s) 80a'. Work is maintained at within the hierarchy of segments 80, 80', 80", etc. in respective pools.

Arrow 780 represents the results of the processing and any aggregation at the code segment 80a' to the code segment 80a. Also, the code segment 80a aggregates results received from each of the code segments 80a'. After the results are transferred, the code segment 80a' process can be terminated, as represented by arrow 790.

With further reference to FIG. 7, additional code segments 80a" are illustrated which may be useful in some embodiments of the present invention. Specifically, there are a number of adapter objects such as the the fixed tree adapter object and the lattice adapter object which support a dual-mode role for a code segment 80a', as noted above. In a dual-mode embodiment, the code segment 80a' operates as an active server. On the one hand, it is a slave to the code segment 80a, and on the other hand as a master to hierarchically subservient code segments 80a" (and possibly 80a"', etc.). In FIG. 7, the arrows 730–790 are illustrated as a single arrow merely for ease of illustration, but communication is the same as previously described.

DNET (Distributed NETwork)

Also present in each program is virtual middleware. In the present example, this has enabled peer-to-peer communication among the computers 1–3. In the preferred embodiment, the virtual middleware is called DNET (Distributed NETwork). DNET is used to send and receive messages, pack and unpack the data into them, and is also used to monitor the health of remote processes. Its messaging interface is based on the PVM standard. Its implementation maps the DNET API onto (parallel virtual machine) PVM or MPI. PVM and MPI allow adapters to be constructed that make inter-slave communications available to their applications. For the MPI mapping, all packing and unpack is implemented inside DNET with the MPI being used to send character buffers. Threads are used to provide fault tolerant timeout safe guards on top of the MPI send and receive commands.

DNET virtual middleware provides a virtual image encapsulating many different computing cluster middlewares, which may be located in different places. DNET offers a unique technology solution making it easy for a parallel application to work with any type of cluster. DNET provides for flexible deployment on different cluster communication platforms, and therefore highly deployable on outsource computing. DNET provides flexible multiple interfaces to applications and the Lobster platform. DNET provides scheduling and queuing on non-dedicated computing environments.

Parsing a problem into sub-tasks is handled by size rather than in relation to an adapter's view of the data structures involved. Lobster uses a master task to control the system, allowing application control and observation of the executing applications. This means the software is fully embeddable into an application. The problem is split through iterative application of the split function into a collection of sub-trees according to the size required.

DNET includes various auxiliary technologies, which extend options for deployment, especially for outsourcing work, and creates a more flexible operational environment. Auxiliary technology includes scheduling and queuing, central control encapsulated environment, communications systems mapping, and separable multiple interfaces.

Applications have inter-process communication based external interfaces separate from their applications. DNET maintains a database of executing applications. Users can connect into existing applications or start new ones. The GUI logic is uploaded automatically if not already present. The GUI can connect and disconnect at will from any computer, anywhere. The distinctions between batch and interactive applications are generalized. The running application will block if it requires user input, until the user reconnects. The same application can be used by different types of GUI, even during the lifetime of a single instance of the application. Interfaces include HTML, CGI, Java, C/C++, DLL's, propriety socket based interfaces, Telnet.

At the DNET middleware level, the Scheduler submits problems to the system and holds them in a queue. They are allocated to groups of machines as machines become available. Software can map at run time on a PVM or HP-PVM type cluster communications environment. All results, error reports and performance information are available in the system.

xCaller (Cross Caller)

The xCaller (cross caller) is a client/server type mechanism that allows an interface program to spawn-off and communicate with an application. The program may be spawn-off on the local machine or submitted into a batch queuing system. The xCaller handles hetergenious data conversion when the application is spawned-on a different architecture to the interface. Specifically, the cross caller provides an interface between the parallelized application 60' and the code segments 80, 80', permitting call backs therebetween.

xCaller maintains a database of executing applications. Users can connect into existing applications or start new ones. The GUI logic is uploaded automatically if not already present. The GUI can connect and disconnect at will from any computer, anywhere. The distinctions between batch and interactive applications are generalized. The running application will block if it requires user input, until the user reconnects. The same application can be used by different types of GUI, even during the lifetime of a single instance of the application. Interfaces include HTML, CGI, Java, C/C++, DLL's, propriety socket based interfaces, Telnet.

The approach of the preferred embodiment of the invention is significantly different from existing parallel computing software approaches which do not provide this type of flexibility and which primarily use a proprietary rather than a standards-based approach. Using the approach of the preferred embodiment avoids the need to invest in expensive high-end computing hardware or development of new applications designed for parallel computing in order to solve complex problems. This system allows for easy integration with existing enterprise customer software. This facilitates a low cost of entry for enterprises by permitting customers to merely modify existing code rather than writing new software solutions. The present invention bridges the gap between parallel application development and cluster computing.

Although an embodiment of the invention has been disclosed for illustrative purposes, those skilled in the art will appreciate that many additions, modification, and substitutions are possible, without departing from the scope and spirit of the invention, which is defined solely by the claims set forth below.

What is claimed is:

1. A method for parallelizing an application, comprising the steps of:
providing an adapter with a plurality of processing algorithm type functionalities;
identifying an algorithm within the application to adapt such that the adapter will parallelize the execution of such algorithm;
associating the adapter with the algorithm within the application, wherein the association between the adapter and the algorithm is based on correlation between the algorithm and one of the plurality of processing algorithm type functionalities;
adapting the application to conform to a plurality of logical components, at least one of the plurality of logical components being encapsulated by the adapter and at least one of the plurality of logical components including non-parallelized or non-adapted code;
creating multiple instances of each of the plurality of logical components;
distributing the multiple instances of each of the plurality of logical components for parallel execution across a plurality of discreet systems or a plurality of processors in a single system; and
monitoring and balancing the parallel execution;
wherein the above steps are executed at run-time.

2. The method of claim 1 further comprising:
using one of the multiple instances with respect to one of the plurality of logical components as a master and the remaining multiple instances as slaves;
using the master to communicate with the slaves in order to retrieve execution information from the slaves, the execution information including information specific to application progress; and
using the master to provide adaptive commands to the slaves based on the execution information in order to optimize execution performance of the slaves.

3. The method of claim 1 further comprising:
including a software engine in at least one of the plurality of logical components to support the adapter, wherein the software engine is configured to cooperate with the associated adapter to control and supervise distributed processing functions; and
including computational and execution environment information in at least one of the plurality of logical components.

4. The method of claim 3, wherein the distributed processing functions include at least one of data mapping, serialization, data and range distribution, and stall and error detection and correction.

5. The method of claim 3, wherein the distributed processing functions coordinate results of the parallel execution with respect to the distributed multiple instances corresponding to the plurality of logical components in real-time and return said results.

6. A method for running an application, comprising the steps of:
identifying a portion of the application for parallelization;
associating an adapter with the identified portion, wherein the adapter is configured to provide a plurality of processing algorithm type functionalities;

creating a master including the adapter and remainder portions of the application not identified for parallelization;

using the master that operates in a master mode to instantiate a plurality of stateless slaves for parallel execution, each stateless slave including a clone of the master;

reporting to the master progress of the parallel execution with respect to the plurality of stateless slaves, the progress including application progress information with respect to the clones; and directing the master to distribute adaptive commands to the plurality of stateless slaves to adjust the parallel execution based on the reported progress;

wherein the above steps are executed at run-time.

7. The method of claim 6 wherein the adaptive commands include data and range information.

8. The method of claim 7 further comprising:

monitoring the progress of the parallel execution with respect to the plurality of stateless slaves after the adaptive commands have been received by the plurality of stateless slaves;

adjusting and re-distributing the adaptive commands including the data and range information to the plurality of stateless slaves based on the monitored progress;

committing the adaptive commands to an optimal level for the parallel execution with respect to the plurality of stateless slaves once an optimal performance level has been reached.

9. The method of claim 6 wherein each stateless slave further includes a software engine configured to cooperate with the clone of the adapter to control and supervise distributed processing functions; and wherein each stateless slave further includes computational and execution environment information.

10. The method of claim 6 further comprising:

distributing the plurality of stateless slaves for parallel execution across a plurality of discreet systems or a plurality of processors in a single system.

* * * * *